(12) United States Patent
Sathyamurthy et al.

(10) Patent No.: US 9,734,045 B2
(45) Date of Patent: Aug. 15, 2017

(54) GENERATING TEST CASES

(71) Applicant: VMWARE, INC., Palo Alto, CA (US)

(72) Inventors: Dattathreya Sathyamurthy, Bangalore (IN); Akhil Sadashiv Hingane, Bangalore (IN); Piyush Bharat Masrani, Bangalore (IN); Amarnath Palavalli, Bangalore (IN); Hemanth Kumar Pannem, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 14/721,006

(22) Filed: May 26, 2015

(65) Prior Publication Data
US 2016/0246706 A1   Aug. 25, 2016

(30) Foreign Application Priority Data

Feb. 20, 2015   (IN) .............................. 822/CHE/2015

(51) Int. Cl.
*G06F 11/36* (2006.01)
(52) U.S. Cl.
CPC ...... *G06F 11/3684* (2013.01); *G06F 11/3664* (2013.01); *G06F 11/3692* (2013.01)
(58) Field of Classification Search
CPC ............. G06F 11/3684; G06F 11/3688; G06F 11/3692
See application file for complete search history.

(56) References Cited

U.S. PATENT DOCUMENTS

| 7,266,808 | B2 * | 9/2007 | Kolawa | G06F 11/3664 714/E11.207 |
|---|---|---|---|---|
| 8,694,964 | B1 * | 4/2014 | Picard | G06F 8/73 715/200 |
| 2005/0229043 | A1 * | 10/2005 | Nasuti | G06F 11/3688 714/38.1 |
| 2006/0230320 | A1 * | 10/2006 | Salvador | G06F 11/3684 714/38.1 |
| 2007/0033442 | A1 * | 2/2007 | Tillmann | G06F 11/3684 714/45 |
| 2012/0151455 | A1 * | 6/2012 | Tsantilis | G06F 11/3688 717/132 |
| 2013/0014084 | A1 * | 1/2013 | Sahibzada | G06F 11/368 717/124 |
| 2015/0135158 | A1 * | 5/2015 | Tenev | G06F 11/3684 717/101 |

\* cited by examiner

*Primary Examiner* — Viva Miller
(74) *Attorney, Agent, or Firm* — Thomas Horstemeyer, LLP

(57) ABSTRACT

Systems and techniques are described for generating test cases. A described technique includes monitoring a manual test of a code portion. The monitoring can include identifying one or more performed operations performed during the manual test. A seed file can be generated that includes data describing the one or more performed operations. A mock test can be generated for the code portion using the seed file. The mock test can include one or more mock operations that match the one or more performed operations. The mock test can be performed on the code portion, including performing the one or more mock operations using the code portion.

20 Claims, 4 Drawing Sheets

GENERATING TEST CASES

CROSS-REFERENCE TO RELATED APPLICATION(S)

Benefit is claimed under 15 U.S.C. 119(a)-(d) to Foreign application Serial No. 822/CHE/2015 filed in India entitled "GENERATING TEST CASES", on Feb. 20, 2015, by VMware, Inc., which is herein incorporated in its entirety by reference for all purposes.

BACKGROUND

This document relates to generating tests for application code.

Software applications can be tested by executing portions of the application code in a test environment. For example, a software developer or software tester may perform manual tests on the application code to ensure that the code executes as expected. Application code can also be tested using test cases. However, the time and effort consumed developing automated test cases put practical limitations on the variety of test cases written. For some complex scenarios, developing test cases can also be non-intuitive.

If a code portion includes, for example, five conditional branches, at least five test cases should be developed to test each branch (i.e., a test case for each branch). On the other hand, it may be relatively easy to test the five branches using manual testing. However, manual tests may not be easily repeatable.

SUMMARY

In general, one aspect of the subject matter described in this document can be embodied in a technique that includes monitoring a manual test of a code portion, wherein monitoring the manual test includes identifying one or more performed operations performed during the manual test; generating a seed file that includes data describing the one or more performed operations; generating, using the seed file, a mock test for the code portion, the mock test including one or more mock operations that match the one or more performed operations performed; and performing the mock test on the code portion, including performing the one or more mock operations using the code portion.

These and other aspects can optionally include one or more of the following features. In some implementations, the one or more performed operations include a call to the code portion and one or more inputs for the code portion. The seed file can include data describing the one or more inputs and data describing one or more outputs output by the code portion during the manual test and based on the one or more inputs. The one or more mock operations of the mock test can include a call to the code portion. The call can include the one or more inputs.

Some implementations include receiving data specifying at least one output from the code portion during the mock test and comparing the at least one output from the code portion during the mock test to the one or more outputs output by the code portion during the manual test.

In some implementations the one or more performed operations include a call to a second code portion different from the code portion. The seed file can include data identifying the second code portion, one or more inputs provided to the second code portion, and one or more outputs received from the second code portion. The one or more mock operations of the mock test can include providing to the code portion the one or more outputs received from the second code portion without initiating a call to the second code portion.

In some implementations, the one or more outputs include an exception generated by the second code portion during the manual test. Some implementations include receiving data identifying the code portion as code for testing. In response to receiving the data, code can be generated that monitors the manual test and that generates the seed file based on the one or more performed operations.

In some implementations, the code portion includes a class and the mock test includes a unit test case. In some implementations, the code portion includes a functional test case or an integration test case.

Particular embodiments of the subject matter described in this document can be implemented so as to realize one or more of the following advantages. By generating test cases for code portions based on manual tests performed for the code portions, the time and effort needed to develop automatic tests can be reduced. For example, a software developer can use the developed test cases without having to generate test inputs and other test data. The quality and maintainability of the application can also be increased as these tests can improve test coverage, mutation coverage, and can reduce regression. Thus, the process of developing, using, and maintaining tests for application code is improved by developing tests based on manual tests. Test data can also be more accurately created by monitoring a manual test as the test data is recorded from an actual test scenario.

The complexity of software tests can also be reduced by monitoring and storing data regarding code portions on which a tested code portion depends. For example, inputs sent to the code portions and outputs received from the code portions can be recorded during a manual test of the tested code portion. The inputs and outputs can then be used during subsequent tests of the tested code portion rather than making actual calls to these other code portions.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for generating test cases. A described technique includes monitoring a manual test of a code portion. The monitoring can include identifying one or more performed operations performed during the manual test. A seed file can be generated that includes data describing the one or more performed operations. A mock test can be generated for the code portion using the seed file. The mock test can include one or more mock operations that match the one or more performed operations. The mock test can be performed on the code portion, including performing the one or more mock operations using the code portion.

Figure 1:
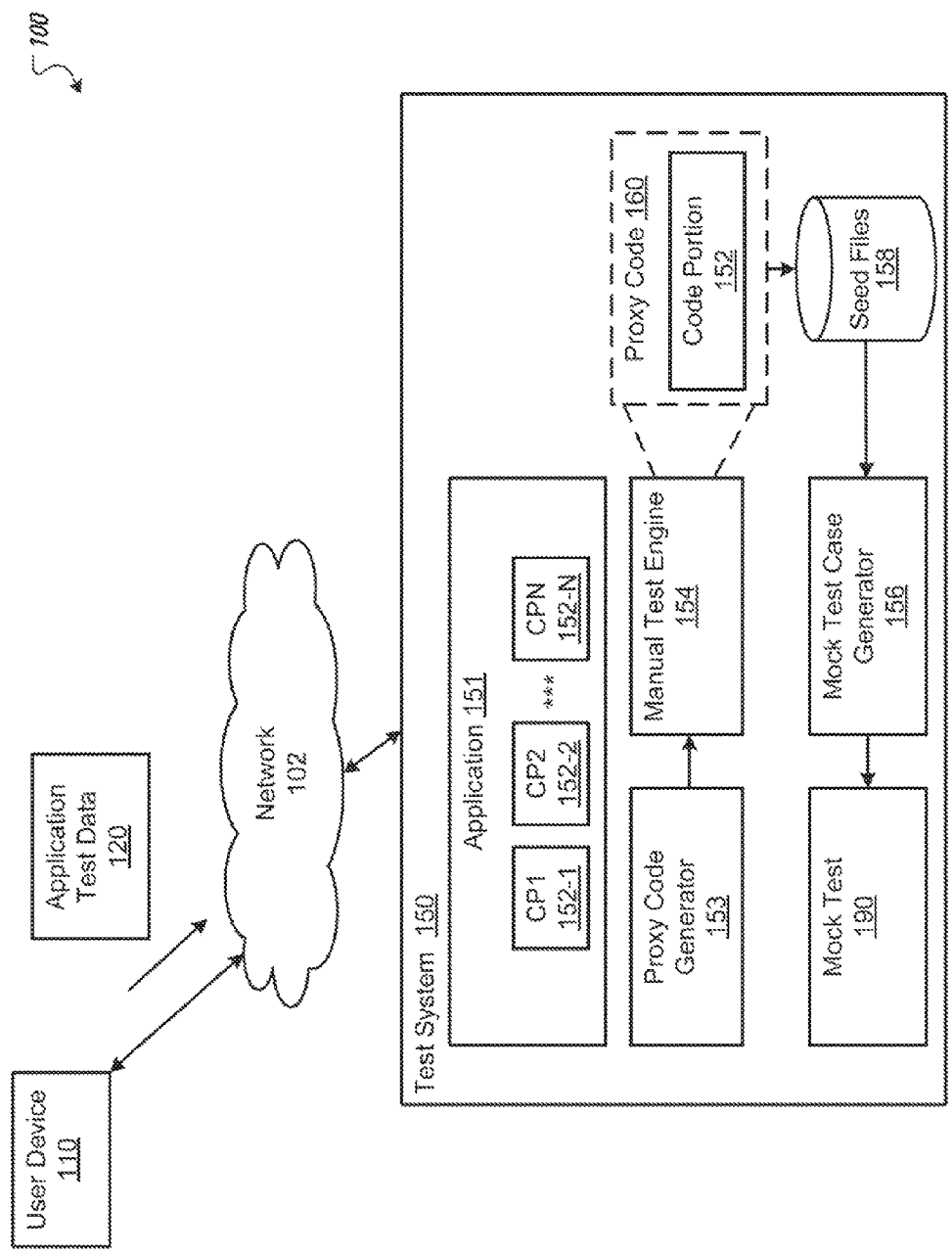
FIG. 1 shows an example environment in which a test system generates mock tests.

FIG. 1 shows an example environment 100 in which a test system 150 generates mock tests. The example environment 100 includes a network 102, e.g., a local area network (LAN), wide area network (WAN), e.g., the Internet, or a combination thereof. The network 102 connects user devices, e.g., the user device 110, with the test system 150.

The user device 110 is an electronic device, e.g., a computer, that can send application test data 120 to the test system 150. The test data 120 can include data that is to be used in a manual test of an application 151 that is stored by the test system 150. For example, the test data 120 may include one or more inputs (e.g., input parameters or values) that are processed by the application 151 during a manual test.

In some implementations, the application test data 120 identifies one or more code portions 152 of the application 151 that are to be tested. For example, the test data 120 may identify code portions that have changed since a previous test and/or new code portions that are to be tested. In some implementations, the test data 120 includes an Extensible Markup Language (XML) file that includes data identifying the code portions to be tested.

In some implementations, the data identifying the code portion(s) to be tested are stored at the test system 150 rather than being transmitted from the user device 110. In addition, in some implementations, a user may provide application test data 120 directly to the test system 150 without the use of a separate user device 110. For example, the test system 150 may be one or more servers that are in data communication with a monitor and input/output devices, e.g., keyboard and mouse, that allow users to interact with the test system 150.

The application 151 can include one or more code portions 152, such as code portions 152-1-152-N. A code portion 152 can include any appropriate portion of code of the application 151. For example, a code portion 152 may be a class, module, routine, method, set of one or more lines of code, a unit of code, or some other appropriate portion of the application. A code portion 152 may be dependent on other code portions. For example, a code portion 152 may include a call to one or more other code portions 152, e.g., to standard routines or modules. These other code portions are also referred to herein as dependency code portions.

The test system 150 enables users to conduct manual tests on code portions of applications, e.g., the code portions 152 of the application 151. A manual test is a test of a code portion 152 in which a user causes the code portion 152 to perform one or more operations during the test. For example, a user may cause the test system 150 to perform a manual test on the code portion 152 using certain inputs to ensure that the code portion outputs an appropriate result for the inputs. In a particular example, a user may test a code portion that determines the sum of two numbers by providing two numbers as input to the code portion 152. The user can then evaluate the output of the code portion 152 to ensure the output is the correct sum of the two input numbers. The inputs to be tested may be included in the application test data 120.

For some code portions, a manual test may include a user playing a role as an end user to verify certain features of the code portion. For example, a software tester may interact with the application 151, e.g., by providing certain inputs or selecting certain objects, to verify that a particular code portion of the application 151 functions properly.

A manual test may be based on a test case. For example, the test case may specify particular actions that the user is to perform during the test and the order in which the actions are to be performed. In some implementations, a manual test is performed without the use of automated testing tools, e.g., tools that provide automated inputs to the code portion in place of the user input.

The test system 150 can generate a mock test for a code portion of the application 151 based on the manual test. A mock test is an automated test for testing a code portion in which software and/or hardware causes the code portion to perform one or more operations during the test. For example, the mock test may be a software application or module that, when executed, causes the code portion to perform the one or more operations. In a particular example, the test system 150 may generate a mock test that tests the code portion using the same, or similar inputs, as those used in the manual test. Continuing the example of a code portion that computes a sum of two numbers, the manual test may cause the code portion to compute the sum of "3" and "7". In this example, a mock test generated based on the manual test may also cause the code portion to compute the sum of "3" and "7", e.g., automatically without user input. For example, the mock test may automatically call the code portion and provide the inputs "3" and "7" to the code portion in a particular sequence that causes the code portion to determine the sum. In this way, the mock test can be used to test the code portion in the future, e.g., after the code portion has been changed or one or more dependencies, e.g., dependent code portions, of the code portion have been changed. In some implementations, the mock test may include operations for a unit test case that tests an individual unit of code, e.g., a class, that was tested using a manual test. In some implementations, the mock test includes a functional test case that tests the code portion against specification for the code portion. In some implementations, the mock test includes an integration test case that tests multiple test cases as a group.

The example test system 150 includes a proxy code generator 153, a manual test engine 154, a mock test case generator 156, and a seed file data store 158 that stores seed files. The proxy code generator 153 generates proxy code 160 that monitors a code portion 152 that is being tested, e.g., being tested manually, and stores data regarding the test in a seed file for the code portion 152. The data stored in the seed file for the code portion 152 can include data identifying the code portion 152, data describing one or more inputs to the code portion 152, e.g., one or more input parameters to be processed by the code portion 152, and/or data describing one or more outputs that were output by the code portion 152, e.g., one or more output values or one or more exceptions. If the code portion 152 includes a call to one or more dependency code portions, data regarding the dependency code portion(s) can also be stored in the seed file. This data can include data identifying the dependency code portion, one or more inputs to the dependency code portion, e.g., one or more parameters passed from the code portion 152 to the dependency code portion, and/or one or more outputs output by the dependency code portion, e.g., one or more parameters passed from the dependency code portion to the code portion 152 and/or one or more exceptions generated by the dependency code portion.

The proxy code generator 153 can identify code portion(s) for which to generate proxy code and generate the proxy code for each code portion to be tested. For example, a user may configure the manual test engine 154 to test certain code portions. In this example, the proxy code generator 153 can access configuration data to identify the code portions to be tested. In another example, as described above, the code portions to be tested may be specified in an XML file, or another appropriate type of file. In this example, the proxy code generator 153 can identify the code portion(s) to be tested from the XML file.

As described in more detail below, the proxy code generator 153 can evaluate the code portion 152 to detect calls to code portions and generate proxy code 160 that monitors inputs and outputs for each call. For example, the proxy code 160 can cause the test system 150 to store data describing each call and each input and output related to each call. In some implementations, the proxy code is implemented using Aspect-Oriented Programming.

The manual test engine 154 enables users to conduct manual tests on code portions, e.g., the code portion 152. For example, the manual test engine 154 may initiate the application 151 or, in some cases, just the code portion 152 being tested. The user can then provide to the manual test engine 154 an input, e.g., one or more input parameters or values, for processing by the code portion 152. In turn, the manual test engine 154 calls the code portion 152 and provides the input to the code portion 152. The code portion 152 then processes the input and generates an output, e.g., one or more output parameters or an exception, based on the input. The manual test engine 154 can obtain the output and provide the output to the user, e.g., by presenting the output on a display. In some implementations, the test system 150 may not include a separate manual test engine 154. For example, the user may provide the input(s) directly to the application 151 during the manual test.

During the manual test, the proxy code 160 monitors the input and output of the code portion and any dependency code portion and stores data describing the input(s) and output(s) in the seed file for the code portion 152. For example, the data describing the input(s) and output(s) may include the values of the input(s) and output(s) and the sequence in which the input(s) and output(s) were provided or received. For calls to dependency code portions, the code portion 152 being tested can complete the call as it normally would in operation. The proxy code 160 can monitor and store in the seed file the input(s) passed from the code portion 152 to the called dependency code portion and any output(s) received by the code portion 152 from the dependency code portion.

In some implementations, the manual test engine 154 may prompt the user at the end of a manual test to specify whether the manual test was successful. The manual test engine 154 can receive input from the user and store data specifying whether the manual test was successful in the seed file. This data can then be used to determine whether to generate a mock test based on the seed file for the manual test. For example, if the manual test was not successful, the code portion may need to be updated prior to generating a mock test for the code portion. Or, if the output value of a manual test is not the expected value, it may not be appropriate to generate a mock test that tests whether the code portion generates this output value in response to the same inputs.

The mock test case generator 156 generates mock tests for code portions based on data stored in the seed file. For example, the mock test generator 156 may generate a mock test 190 that tests the code portion 152 using the same, or similar, input as used in the manual test. The mock test 190 can include a call to the code portion 152 using the same input. If the code portion 152 included a call to a dependency code portion during the manual test, the mock test 190 can allow the code portion to make the same call during execution of the mock test. In some implementations, the mock test 190 may not include calls to dependency code portions. Instead, the mock test 190 may include code that provides to the code portion 152 the output that was provided by the dependency code portion during the manual test. For example, the code portion 152 may make a call to dependency code portion A during the manual test and provide an input value of "1" to dependency code portion A. In turn, dependency code portion A may return a value of "10". In this example, the mock test 190 may include code that causes the value of "10" to be provided to the code portion in response to a call to code portion A that includes an input value of "1" during execution of the mock test 190, without actually executing the dependency code portion.

The mock test case generator 156 can generate the mock test 190 by processing the seed file for the code portion 152 and generating code based on certain data found in the seed file. For example, the mock test case generator 156 may detect in the seed file data describing a call to code portion 152 and generate a call to the code portion 152 using the same input. The mock test case generator 156 can also detect in the seed file data describing calls to dependency code portions. For dependency code portions, the mock test case generator 156 may include in the mock test 190 code that causes the mock test 190 to return the output of the dependency code portion to the code portion 152 during an execution of the mock test 190. The mock test 190 may be stored by the test system 150 for later use.

The mock test 190 can be used as a repeatable and reliable test for the code portion 152, e.g., at a later time. For example, if the code portion 152 or a dependency code portion of the code portion 152 is changed, the mock test 190 can be used to test the code portion 152. The input to the code portion 152 can also be used to generate additional test data for the code portion 152. For example, additional test data may be generated using values that are within a threshold amount of the input values used in the manual test for the code portion.

Figure 2:
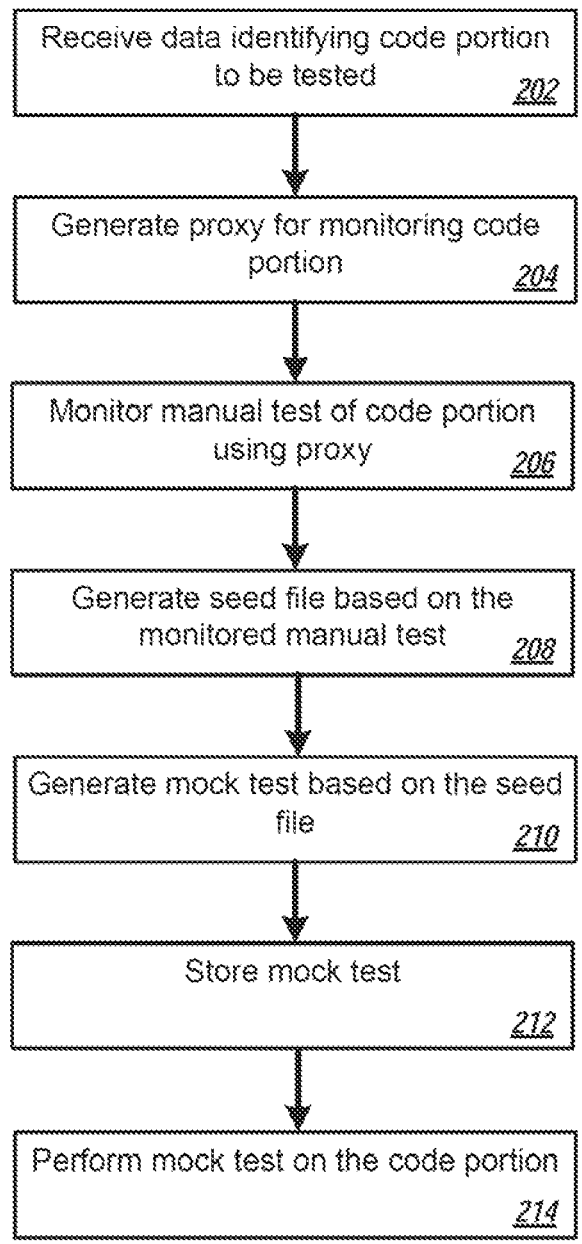
FIG. 2 is a flow chart of an example technique for generating a mock test.

FIG. 2 is a flow chart of an example technique 200 for generating a mock test. The example technique 200 is performed by a system of one or more computers. For example, the technique 200 may be performed by the test system 150 of FIG. 1.

The system receives data identifying a code portion to be tested (202). For example, a user may provide data identifying a code portion that has been added or changed and that needs to be tested, e.g., using a manual test. As described above, the data identifying the code portion may be received in an XML file, or other appropriate type of file, that identifies one or more code portions for testing.

The system generates a proxy for monitoring the code portion during a manual test of the code portion (204). In some implementations, the proxy includes proxy code that detects calls to the code portion under test and/or calls to dependency code portions of the code portion under test. In response to detecting such a call, the proxy can cause the system to store data describing the call in a seed file. For example, this data describing a call can include data identifying the code portion called, an input to the called code portion, e.g., one or more input parameters, and/or an output received from the called code portion, e.g., one or more output parameters or an exception or error message.

In some implementations, the proxy code is included in the code portion under test. For example, the system can detect certain lines of code in the code portion that are to be monitored. The lines of code may be those that initiate a class or other code portion or that receive a value from another code portion. For each line of code, the proxy code may include code that causes the system to store in a seed file data regarding the line of code during the manual test of the code portion under test.

The system monitors a manual test of the code portion (206). For example, the proxy may monitor the manual test of the code portion and store data in a seed file based on the manual test. Proxy code of the proxy, may cause the system to store data identifying a call to the code portion under test, any calls to dependency code portions, and any input/output of the code portion under test and/or of the dependency code portion. For example, when a particular code portion is called, the proxy code may cause data identifying the code portion and any input provided to the code portion to be stored in a seed file. When an output is received from the code portion, the proxy code may cause data describing the output to be stored in the seed file.

The system generates a seed file for the code portion under test based on the monitored manual test (208). For example, as described above, the system may store data in the seed file as the manual test is conducted. At the completion of the manual test, the system may store the seed file in a seed the data store. The seed file may also include data specifying whether the manual test was successful, e.g., resulted in the expected output. As described above, this can be used to determine whether to generate a mock test based on the manual test.

The system generates a mock test for the code portion based on the seed the (210). As described above, the mock test may include operations the same as, or similar to, those of the manual test. For example, the manual test may include an operation to initiate the code portion under test and provide an input to the code portion. The input to the code portion of the mock test may be the same as the input provided to the code portion during the manual test. For calls to dependency code portions during the manual test, the mock test may include code that causes the output of the dependency code portion to be provided to the code portion under test when the dependency code portion is to be called, or is to return an output, during the mock test.

The system can generate the mock test by evaluating data stored in the seed file for the code portion. For example, the system may identify in the seed file data describing the initiation of the code portion under test and any input provided to the code portion when the code portion was initialized during the manual test. For this data, the system may include in the mock test an operation that initializes the code portion and an operation that passes the input of the manual test to the code portion.

The system may also identify in the seed file an output generated by the code portion under test during the manual test. For the output, the system may generate an operation for the mock test that compares the result of the execution of the code portion during, the mock test to the output generated by the code portion during the manual test. For example, if the input to the mock test and the input used during the manual test are the same and the code portion has the same functionality during both tests, the outputs should be the same. This operation of the mock test can compare the results to ensure that the same output is achieved during the mock test as achieved during the manual test.

The system may also identify in the seed file any calls to a dependency code portion. For a call to a dependency code portion, the system ma generate an operation for the mock test that provides a value to the code portion during the mock test. For example, when the dependency code portion should be called during the mock test, this operation can provide the result of the dependency code portion from the manual test to the code portion under test. In this way, the mock test can test the code portion using the same value from the dependency code portion without needing to call the dependency code portion.

In some implementations, the mock test may include an actual call to the dependency code portion. For example, the code portion may be tested using the mock test based on one of the code portion's dependency code portions being modified. In this way, the functionality of the code portion using the modified dependency code portion can be tested.

In this way, unit tests that mock all dependencies of a code portion under test can be developed using a seed file for a manual test. For example, the mock test for a unit test can provide to the code portion outputs for each dependency code portion called by the code portion. In addition, module tests that mock only inter-module dependencies and integration tests that do not mock anything can also be developed using a seed file of a corresponding manual test.

The system stores the mock test (212). For example, the system may store the mock test in a test suite. In some implementations, a user may first review the mock test and approve the mock test before the test is stored in the test suite.

The system performs the mock test (214). For example, a user may request that the mock test be performed in response to a change in the code portion. In another example, the mock test may be performed in response to a test suite in which the mock test is stored being triggered by a continuous integration system or by a user. During the execution of the mock test, the output of the code portion may be compared to the output of the code portion during the manual test. If the outputs are the same, the code portion may be deemed to have passed the test.

Figure 3:
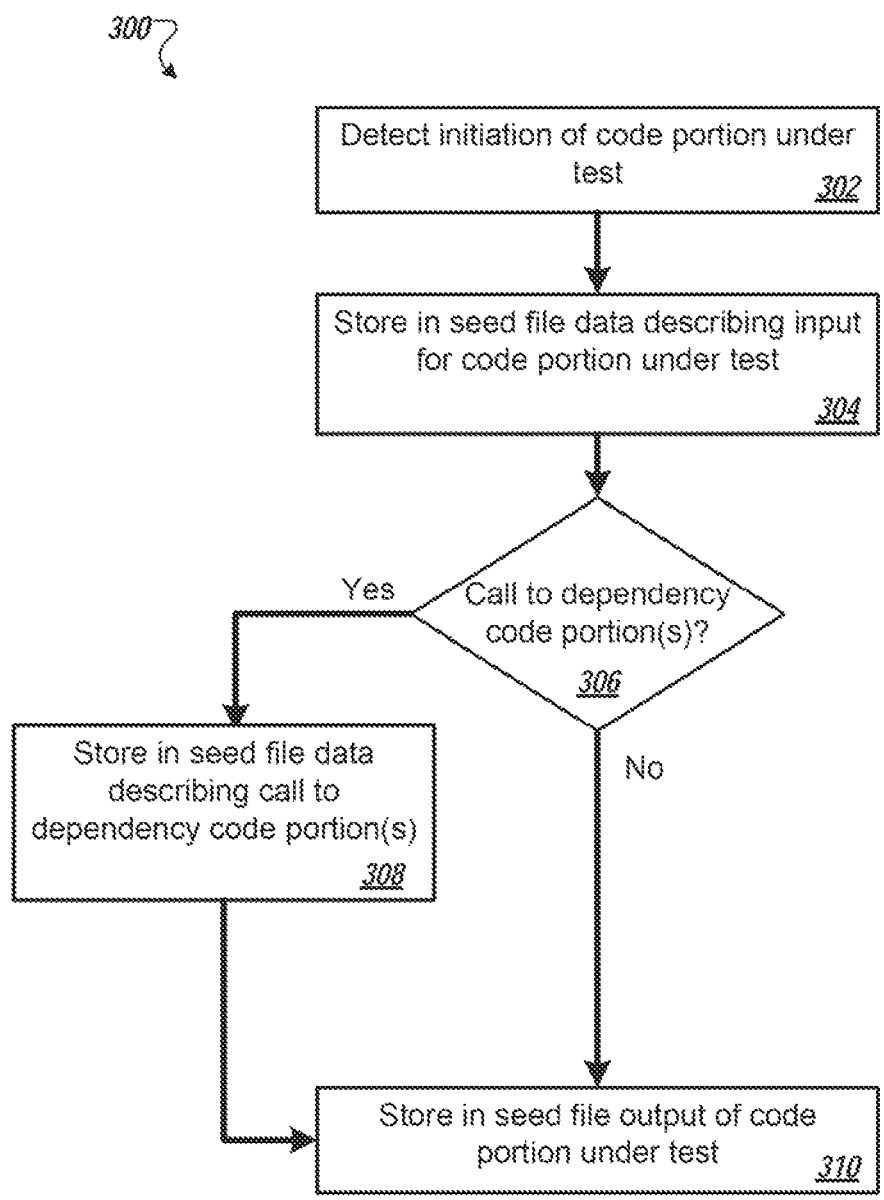
FIG. 3 is a flow chart of an example technique for generating a seed file for a manual test.

FIG. 3 is a flow chart of an example technique 300 for generating a seed file for a manual test. The example technique 300 is performed by a system of one or more computers. For example, the technique 300 may be performed by the test system 150 of FIG. 1.

The system detects the initiation of a code portion under test (302). For example, the system may monitor, using proxy code, for a call to a particular code portion that is to be tested. The system may also monitor for any input, e.g., one or more input parameters, that are provided to the code portion under test when, or after, the code portion is initialized.

The system stores in a seed file data describing the input for the code portion under test (304). For example, the system may store in the seed file data identifying the code portion called and the value of each input parameter provided to the code portion.

The system can also monitor for any calls to a dependency code portion from the code portion under test (306). If the system detects a call to a dependency code portion, the system can store in the seed file data describing the call to the dependency code portion (308). This data can include data identifying the dependency code portion, an input provider to the dependency code portion, e.g., one or more input parameters, and/or an output received from the dependency code portion, e.g., one or more output parameters.

The system may also store in the seed file temporal data for the monitored operations. For example, the system may store the data for each operation in sequential order. In another example, the system may store a timestamp for each operation that specifies the time at which the operation was performed during the manual test. In this way, a mock test generated based on the seed file can cause the code portion to perform the same operations in the same sequence.

The system stores in the seed file the output of the code portion under test (310). For example, the system may monitor, using proxy code, for the completion of the code portion under test and the output that is output by the code portion under test when the code portion has completely executed. After the output is detected, the system may store the output in the seed file, e.g., along with data indicating that the code portion has completed and/or a timestamp that specifies the time at which the code portion was completed.

Figure 4:
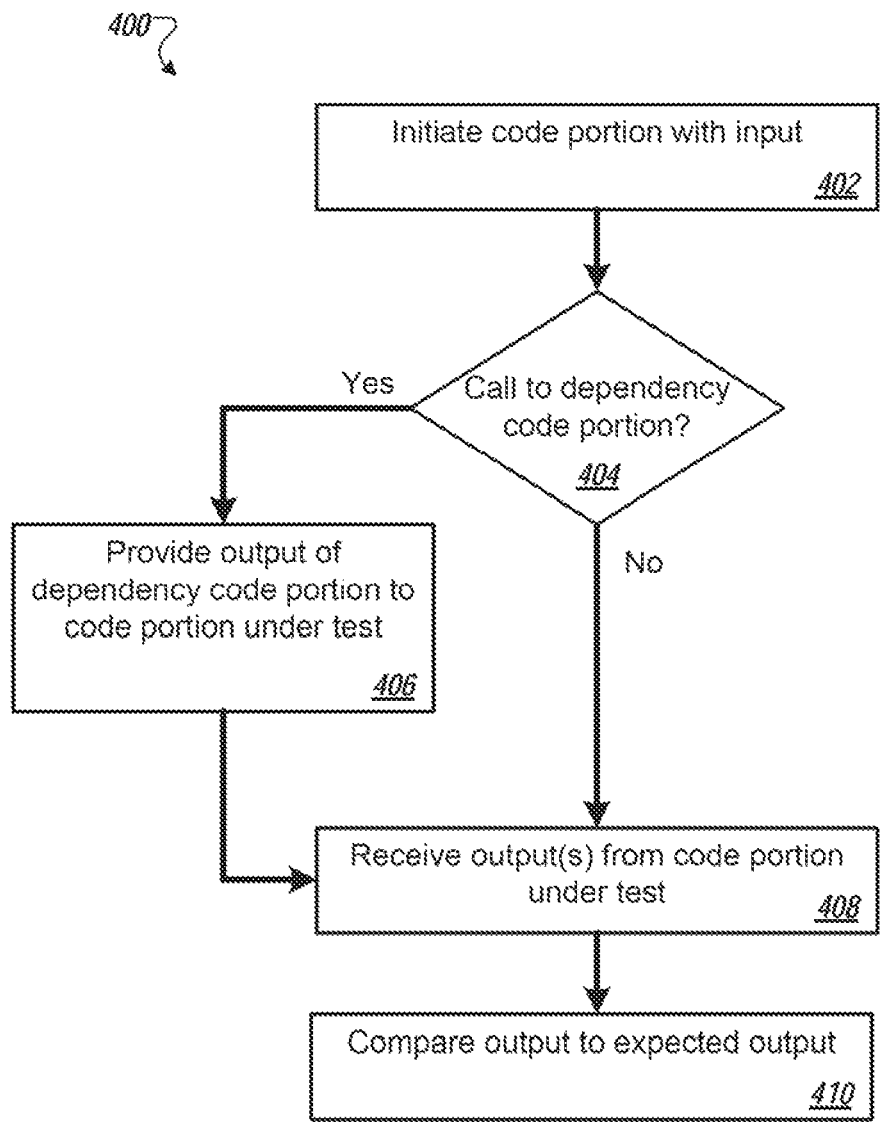
FIG. 4 is a flow chart of an example technique for performing a mock test.

FIG. 4 is a flow chart of an example technique 400 for performing a mock test. The example technique 400 is performed by a system of one or more computers. For example, the technique 400 may be performed by the test system 150 of FIG. 1.

The system initiates the code portion (402). The system may also pass an input to the code portion. For example, if an input was provided to the code portion during the manual test, the system may provide the same input to the code portion when or after the code portion is initialized during the mock test. The input may be specified by the mock test.

The system can also detect a call to a dependency code portion by the code portion under test during the mock test (404). If the system detects a call to a dependency code portion during the mock test, the system can provide an output of the dependency code portion to the code portion under test (406). As described above, the output of the dependency code portion(s) can be stored in the seed file. The mock test for the code portion under test can include an operation that provides the output to the code portion when the call to the dependency code portion is detected. In some implementations, the mock test may include code that causes the system to obtain the output for the dependency code portion from the seed file and provide the output to the code portion when the call to the dependency code portion is detected.

The system receives an output from the code portion under test (408). For example, the code portion may process the input to the code portion and any outputs received from the dependency code portion(s) to determine an output. When execution of the code portion has completed, the system may detect the output of the code portion.

The system compares the output of the code portion during the mock test to the expected output (410). For example, the expected output may be the output of the code portion during the manual test. If the outputs match, the code portion may be deemed to have passed the mock test.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or it combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   monitoring a manual test of a code portion, wherein monitoring the manual test comprises identifying one or more performed operations performed during the manual test;
   detecting a call to a dependency code portion by the code portion during the manual test within the one or more performed operations;
   generating a seed file that includes data describing the one or more performed operations including a manual test output from the code portion, data describing the call to the dependency code portion including a dependency code input and a dependency code output that are detected during the manual test, and data that indicates the manual test is successful based at least in part on the manual test output matching an expected output;
   determining to generate a mock test based at least in part on the seed file including the data that indicates the manual test is successful;
   generating, using the seed file, the mock test for the code portion, the mock test including one or more mock operations that match the one or more performed operations, wherein the mock test provides the dependency code output to the code portion in response to the dependency code input without executing the dependency code portion; and
   performing the mock test on the code portion, including performing the one or more mock operations using the code portion without executing the dependency code portion.

2. The method of claim 1, wherein:
the one or more performed operations include a call to the code portion and a manual test input for the code portion;
the seed file includes data describing the manual test input; and
the one or more mock operations of the mock test includes a call to the code portion, the call including the manual test input.

3. The method of claim 2, further comprising:
receiving data specifying a mock test output from the code portion during the mock test; and
determining that the mock test is successful by at least comparing the mock test output from the code portion during the mock test to the manual test output by the code portion during the manual test.

4. The method of claim 1, wherein:
the seed file further includes data identifying the code portion, and data identifying the dependency code portion.

5. The method of claim 4, wherein the manual test output comprises an exception generated by the dependency code portion during the manual test.

6. The method of claim 1, further comprising:
receiving data identifying the code portion as code for testing; and
in response to receiving the data, generating code that monitors the manual test and that generates the seed file based on the one or more performed operations.

7. The method of claim 1, wherein the code portion includes a class and the mock test includes a unit test case.

8. The method of claim 1, wherein the code portion includes a functional test case or an integration test case.

9. A system comprising:
a data processing apparatus; and
a memory apparatus in data communication with the data processing apparatus and storing instructions executable by the data processing apparatus and that upon such execution cause the data processing apparatus to perform operations comprising:
    monitoring a manual test of a code portion, wherein monitoring the manual test comprises identifying one or more performed operations performed during the manual test;
    detecting a call to a dependency code portion by the code portion during the manual test within the one or more performed operations;
    generating a seed file that includes data describing the one or more performed operations including a manual test output from the code portion, data describing the call to the dependency code portion including a dependency code input and a dependency code output that are detected during the manual test, and data that indicates the manual test is successful based at least in part on the manual test output matching an expected output;
    determining to generate a mock test based at least in part on the seed file including the data that indicates the manual test is successful;
    generating, using the seed file, the mock test for the code portion, the mock test including one or more mock operations that match the one or more performed operations wherein the mock test provides the dependency code output to the code portion in response to the dependency code input without executing the dependency code portion; and
    performing the mock test on the code portion, including performing the one or more mock operations using the code portion without executing the dependency code portion.

10. The system of claim 9, wherein
the one or more performed operations include a call to the code portion and a manual test input for the code portion;
the seed file further includes data describing the manual test input; and
the one or more mock operations of the mock test includes a call to the code portion, the call including the manual test input.

11. The system of claim 10, wherein the operations further comprise:
receiving data specifying a mock test output from the code portion during the mock test; and
determining that the mock test is successful by at least comparing the mock test output from the code portion during the mock test to the manual test output by the code portion during the manual test.

12. The system of claim 9, wherein:
the seed file includes data identifying the code portion, and data identifying the dependency code portion.

13. The system of claim 12, wherein the manual test output comprises an exception generated by the dependency code portion during the manual test.

14. The system of claim 9, further comprising:
receiving data identifying the code portion as code for testing; and
in response to receiving the data, generating code that monitors the manual test and that generates the seed file based on the one or more performed operations.

15. The system of claim 9, wherein the code portion includes a class and the mock test includes a unit test case.

16. The system of claim 9, wherein the code portion includes a functional test case or an integration test case.

17. A computer storage medium encoded with a computer program, the program comprising instructions that when executed by a data processing apparatus cause the data processing apparatus to perform operations comprising:
    monitoring a manual test of a code portion, wherein monitoring the manual test comprises identifying one or more performed operations performed during the manual test;
    detecting a call to a dependency code portion by the code portion during the manual test within the one or more performed operations;
    generating a seed file that includes data describing the one or more performed operations including a manual test output from the code portion, data describing the call to the dependency code portion including a dependency code input and a dependency code output that are detected during the manual test, and data that indicates the manual test is successful based at least in part on the manual test output matching an expected output;
    determining to generate a mock test based at least in part on the seed file including the data that indicates the manual test is successful;
    generating, using the seed file, the mock test for the code portion, the mock test including one or more mock operations that match the one or more performed operations wherein the mock test provides the dependency code output to the code portion in response to the dependency code input without executing the dependency code portion; and performing the mock test on the code portion, including performing the one or more mock operations using the code portion without executing the dependency code portion.

18. The computer storage medium of claim 17, wherein:
the one or more performed operations include a call to the code portion and a manual test input for the code portion;
the seed file includes data describing the manual test input; and
the one or more mock operations of the mock test includes a call to the code portion, the call including the manual test input.

19. The computer storage medium of claim 18, wherein the operations further comprise:
receiving data specifying a mock test output from the code portion during the mock test; and
determining that the mock test is successful by at least comparing the mock test output from the code portion during the mock test to the manual test output by the code portion during the manual test.

20. The computer storage medium of claim 17, wherein:
the seed file further includes data identifying the code portion, and data identifying the dependency code portion.

* * * * *